(12) United States Patent
Regehly

(10) Patent No.: US 12,539,670 B2
(45) Date of Patent: Feb. 3, 2026

(54) METHOD AND DEVICE FOR PRODUCING A THREE-DIMENSIONAL OBJECT IN AN OPTICALLY REACTIVE STARTING MATERIAL

(71) Applicant: xolo GmbH, Berlin (DE)

(72) Inventor: Martin Regehly, Berlin (DE)

(73) Assignee: xolo GmbH, Berlin (DE)

( * ) Notice: Subject to any disclaimer, the term of this patent is extended or adjusted under 35 U.S.C. 154(b) by 791 days.

(21) Appl. No.: 17/648,437

(22) Filed: Jan. 20, 2022

(65) Prior Publication Data
US 2022/0227051 A1 Jul. 21, 2022

(51) Int. Cl.
*B29C 64/282* (2017.01)
*B33Y 10/00* (2015.01)
*B33Y 30/00* (2015.01)
*C08F 2/46* (2006.01)

(52) U.S. Cl.
CPC ............ *B29C 64/282* (2017.08); *B33Y 10/00* (2014.12); *B33Y 30/00* (2014.12); *C08F 2/46* (2013.01)

(58) Field of Classification Search
CPC .......... B33Y 10/00; B29C 64/282; C08F 2/46
See application file for complete search history.

(56) References Cited

U.S. PATENT DOCUMENTS

| | | | |
|---|---|---|---|
| 9,899,956 B2 † | 2/2018 | Clark | |
| 10,040,224 B2 | 8/2018 | Saruhashi et al. | |
| 10,523,924 B2 † | 12/2019 | Lippert | |
| 10,843,410 B2 † | 11/2020 | Lippert | |

(Continued)

FOREIGN PATENT DOCUMENTS

| | | | | |
|---|---|---|---|---|
| CN | 107175823 | * | 9/2017 | |
| WO | WO-2019194798 A1 | * | 10/2019 | ........... B29C 64/135 |
| WO | WO-2020028431 A1 | * | 2/2020 | ............... B22F 10/80 |

OTHER PUBLICATIONS

CN 107175823 English language translation (Year: 2017).*

(Continued)

*Primary Examiner* — Larry W Thrower
(74) *Attorney, Agent, or Firm* — SNELL & WILMER L.L.P.

(57) ABSTRACT

The invention relates to a method for producing a three-dimensional object in an optically reactive starting material, comprising: providing an optically reactive starting material (4) in a working volume (5), wherein the optically reactive starting material (4) contains active molecules of a dual-color photoinitiator; and optically processing the starting material (4) to produce a three-dimensional object by radiating with light of a first wavelength and light of a second wavelength that is different from the first wavelength. The optical processing comprises the following: a) radiating the light of the first wavelength through an opening (20) of an entrance pupil (11) located upstream of an objective (12) and through the objective (12), wherein the objective (12) focuses the light of the first wavelength in the starting material into a focus volume in a focus of the objective (12) such that active molecules that absorb the light of the first wavelength transition into an intermediate state; b) radiating the light of the second wavelength via the entrance pupil (11) and the objective (12), wherein the objective (12) focuses the light of the second wavelength in the starting material (4) into the focus volume such that active molecules within the focus volume that are in the intermediate state and absorb the light of the second wavelength transition into a reactive state and a chemical reaction is thereby triggered in the focus volume, by means of which a material property of the starting material (4) is locally changed; and c) producing the three-dimensional object by repeating steps a) and b) for further focus volumes; wherein, during radiation, the light of (Continued)

the first wavelength and the light of the second wavelength are radiated, on the path to the focus volume, in a spatially non-overlapping manner at least when passing through the entrance pupil (11) and when passing through the objective (12) and in a spatially overlapping manner in the focus volume. Furthermore, a device for producing a three-dimensional object in an optically reactive starting material is provided.

20 Claims, 5 Drawing Sheets

(56) References Cited

U.S. PATENT DOCUMENTS

| | | |
|---|---|---|
| 10,967,578 B2 † | 4/2021 | Clark |
| 2017/0021455 A1 | 1/2017 | Dallarosa et al. |
| 2019/0047224 A1 | 2/2019 | Trautmann et al. |
| 2021/0291460 A1 † | 9/2021 | Clark |
| 2021/0394437 A1 * | 12/2021 | Matheu ................. G06F 30/20 |

OTHER PUBLICATIONS

Examination Report, German Patent Application No. 10 2021 101 164.7, Jul. 14, 2021.
Extended European Search Report, European Patent Application No. 22152065.3, May 24, 2022.
Ncomms 15239.†

\* cited by examiner
† cited by third party

METHOD AND DEVICE FOR PRODUCING A THREE-DIMENSIONAL OBJECT IN AN OPTICALLY REACTIVE STARTING MATERIAL

CROSS-REFERENCE TO RELATED APPLICATIONS

This application claims priority to German Patent Application No. 102021101164.7, filed Jan. 20, 2021, which is incorporated by reference herein.

The invention relates to a method and to a device for producing a three-dimensional object in an optically reactive starting material.

BACKGROUND

Starting materials can be processed optically, i.e., by radiating light of one or more wavelengths onto the starting material in order to thereby change at least one material property of the starting material. For example, it is known as such to cure a starting material with the aid of such optical processing. In this way, three-dimensional objects or bodies can be produced in the starting material. A method of dual-photon stereolithography is known from document WO 2009/014501 A1. Dual-photon stereolithography can be performed using a photocurable material comprising a poly(meth)acrylate having a (meth)acrylate functionality of at least three and a molecular weight (MW) of at least 650, a urethane(meth)acrylate having a (meth)acrylate functionality of 2 to 4 and a MW of 400 to 10,000, a di(meth)acrylate of bisphenol A or bisphenol F, and a photoinitiator. A light beam is focused onto a focus region of the material in order to induce dual-photon absorption of light of a single wavelength in the focus region and thus polymerization of the material in the focus region. The beam is scanned across the material according to a preselected pattern such that the beam is focused onto different preselected regions to induce polymerization of the material in the preselected regions.

A method for generating a permanent structure with high spatial resolution is known from document EP 1 616 344 A1. In order to generate a permanent structure with high spatial resolution, a substance that can be changed using an optical signal is provided in a writing region. The optical signal is applied to the writing region in such a way that it deliberately leaves out a spatially limited sub-region in which a different state of the substance is permanently set than in sub-regions of the writing region detected by the optical signal. In this case, the sub-region deliberately left out by the optical signal is a local intensity minimum of the optical signal. The optical signal is applied outside the deliberately left out spatially delimited sub-region in such a way that saturation is achieved when the substance is changed using the optical signal. In this way, it is possible to go below the diffraction limit in the structure generated.

In document WO 01/71431 A1, a method for holographic recording by means of ultra-fast dual-photon photopolymerization is known. A method and photoactive media for holographic recording and micro/nanofabrication of optical and bio-optical structures by simultaneous absorption of two photons by the photoactive media to induce a simultaneous photochemical change in regions of constructive interference within a holographic pattern are disclosed. The photochemical polymerization process, which results from the simultaneous absorption of two photons, can be used for the microfabrication of micro- and nano-scale features, for the storage of holographic data, and for the formation of switchable diffraction gratings. In one example, a dual-beam holographic configuration is used in a configuration with different optics.

Dual-photon polymerization initiators for use in organic solvents are known in document DE 10 2014 008 994 B3.

Document DE 10 2016 007 736 A1 discloses a method for locally modifying a substrate, in which a substrate arrangement is provided that has active molecules in the substrate or in the immediate vicinity thereof. The active molecules can be photonically excited from a ground state into a first excited state by absorbing a first wavelength and photonically excited from their first excited state into a second excited state by absorbing a second wavelength, wherein there is a spontaneous, radiationless de-excitation path from the second excited state. By absorbing a third wavelength, the active molecules can be de-excited from their first excited state to their ground state while emitting stimulated emission. The method further includes: generating three laser beams of the mentioned wavelengths, wherein the profile of the third laser beam has a zero intensity range and the temporal coordination of the laser beams takes place in such a way that active molecules are photonically excited into their first excited state by absorbing the first laser beam, de-excited into their ground state again outside the zero intensity range under stimulated emission, photonically excited into their second excited state within the zero intensity range, and de-excited in a radiationless manner while releasing thermal energy that locally modifies the substrate.

Document U.S. Pat. No. 5,325,324 A describes a three-dimensional optical memory, the content of which is written via focused laser pulses of a first wavelength and read out via focused laser pulses of a second wavelength. To generate an excitation only in the focus volume, nonlinear dual-photon absorption is used.

Document US 2014/0145093 A1 discloses a method for fluorescence microscopy (stimulated emission depletion—STED), in which a laser beam of a first wavelength generates a first focal point in the working volume. This stimulates the fluorescence of the examined material. A laser beam of a second wavelength is radiated via the same objective, which laser beam generates a donut-shaped, second focus that overlaps the first focus and excites the fluorescence in the outer regions of the first focus. This results in a smaller luminous region than the diffraction limit of the first focus.

Document US 2011/0039213 A1 discloses a method in which a focused laser beam of a first wavelength excites a photoinitiator. The photoinitiator can be selectively de-excited from the intermediate state (STED process) by means of laser light of a second wavelength radiated shortly thereafter with a donut-shaped focus. The width of the focal point excited by the first wavelength can be reduced by a geometric offset of the focal point of the second wavelength.

Document WO 2017/106187 A1 describes a method in which a focused laser beam of a first wavelength excites a photoinitiator into an intermediate state. The photoinitiator can be selectively de-excited from the intermediate state by means of a second wavelength. In this way, the width of the focal point excited by the first wavelength can be reduced. Using a third focused laser beam, the molecules still in the intermediate state are excited into a final state from which the local polymerization of the starting material is started. The method is designed for structuring photoresists, for example for semiconductor production.

Document DE 10 2016 007 736 A1 discloses a method for locally modifying a substrate, in which a focused laser beam of a first wavelength excites a photoinitiator into an intermediate state. Using a second focused laser beam, the molecules that are still in the intermediate state are converted to a further, more excited state, from which a large part of the excitation energy is given off to the local environment in the form of thermal energy, resulting in temperature-induced modification of the substrate, for example polymerization. Using a third wavelength, the photoinitiator can be selectively de-excited from the intermediate state by stimulated emission (STED process). In this way, the width of the focal point excited by the first wavelength can be reduced.

In document WO 2020/245456 A1, a method and a device for locally polymerizing an optically active starting material by means of dual-color polymerization (absorption of light of different wavelengths) and the use thereof for producing a three-dimensional object are known.

SUMMARY

The object of the invention is to provide a method and a device for producing a three-dimensional object in an optically reactive starting material, with which method and device three-dimensional objects with any external shape can be produced with high spatial resolution.

To achieve this, a method and a device for producing a three-dimensional object in an optically reactive starting material according to independent claims 1 and 12 are provided. The dependent claims relate to embodiments.

According to one aspect, a method for producing a three-dimensional object in an optically reactive starting material is provided, which method comprises the following: Providing an optically reactive starting material in a working volume, wherein the optically reactive starting material contains active molecules of a dual-color photoinitiator; and optically processing the starting material to produce a three-dimensional object in the working volume by radiating with light of a first wavelength and light of a second wavelength that is different from the first wavelength, wherein the light of the first wavelength and the light of the second wavelength are provided by a lighting device. The optical processing comprises the following: a) radiating the light of the first wavelength through an opening of an entrance pupil located upstream of an objective and through the objective, wherein the objective focuses the light of the first wavelength in the starting material into a focus volume in a focus of the objective such that active molecules that absorb the light of the first wavelength transition into an intermediate state; b) radiating the light of the second wavelength via the entrance pupil and the objective, wherein the objective focuses the light of the second wavelength in the starting material into the focus volume such that active molecules within the focus volume that are in the intermediate state and absorb the light of the second wavelength transition into a reactive state and a chemical reaction is thereby triggered in the focus volume, by means of which a material property of the starting material is locally changed; and c) producing the three-dimensional object by repeating steps a) and b) for further focus volumes that are different from the focus volume. During radiation, the light of the first wavelength and the light of the second wavelength are radiated, on the path to the focus volume, in a spatially non-overlapping manner at least when passing through the entrance pupil and when passing through the objective and in a spatially overlapping manner in the focus volume.

According to a further aspect, a device for producing a three-dimensional object in an optically reactive starting material is provided, which device comprises the following: a working volume that is configured to receive an optically reactive starting material, wherein the optically reactive starting material contains active molecules of a dual-color photoinitiator; a lighting device that is configured to provide light of a first wavelength and light of a second wavelength that is different from the first wavelength, for radiation onto the working volume; an objective that is configured to radiate the light of the first wavelength and the light of the second wavelength into a focus volume in a focus of the objective in the optically reactive starting material; and an entry pupil that is located upstream of the objective in the direction of incidence of light in such a way that the light of the first wavelength and the light of the second wavelength reach the objective through an opening of the entrance pupil. During radiation, the light of the first wavelength and the light of the second wavelength can be radiated, on the path to the focus volume, in a spatially non-overlapping manner at least when passing through the entrance pupil and when passing through the objective and in a spatially overlapping manner in the focus volume. The lighting device, the entrance pupil, and the objective are also configured to optically process the starting material in the working volume to produce a three-dimensional object as follows: a) radiating the light of the first wavelength through the entrance pupil and through the objective, wherein the objective focuses the light of the first wavelength in the starting material into the focus volume such that active molecules that absorb the light of the first wavelength transition into an intermediate state; b) radiating the light of the second wavelength via the entrance pupil and the objective, wherein the objective focuses the light of the second wavelength in the starting material into the focus volume such that active molecules within the focus volume that are in the intermediate state and absorb the light of the second wavelength transition into a reactive state and a chemical reaction is thereby triggered in the focus volume, by means of which a material property of the starting material is locally changed; and c) producing the three-dimensional object by repeating steps a) and b) for further focus volumes that are different from the focus volume.

With the aid of the method and the device, it is possible to optically process the smallest focus volumes in the starting material separately and one after the other, for example to harden or cure, in order to gradually produce the three-dimensional object or the three-dimensional article. The focus of the objective, in which the light of the first wavelength and the light of the second wavelength spatially overlap locally (in the focus volume) in the starting material, is gradually moved through the starting material in order to produce the object having the three-dimensional shape or structure. Active molecules of the dual-color photoinitiator are only brought from the intermediate state to the reactive state in the focus volume because it is only there that the light of the first wavelength and the light of the second wavelength are radiated onto the active molecules at a sufficiently short interval one after the other and/or with a temporal overlap such that the transition to the reactive state takes place by means of absorption of the light of the second wavelength from the intermediate state before the active molecules relax from this intermediate state, which was reached by the active molecules due to the absorption of the light of the first wavelength.

The light of the first wavelength and the light of the second wavelength can each be radiated such that they each fill approximately half of an opening area of the opening of the entrance pupil. In this embodiment, the opening area of the opening of the entrance pupil can be divided into two semicircles, for example, each of which is illuminated by the light of the first wavelength or the light of the second wavelength. Alternatively, it can be provided that the opening area of the opening of the entrance pupil is only partially illuminated by the light of the first wavelength and the light of the second wavelength, such that at least a sub-region of the opening area is not illuminated by the light (exposed).

The light of the first wavelength and the light of the second wavelength can each be radiated such that they fill (illuminate) approximately half of a cross-sectional area of a light passage of the objective. In relation to the cross-sectional area of the light passage of the objective, the explanations given above in connection with the opening area of the opening of the entrance pupil apply accordingly to embodiments.

The focus volume and the further focus volumes can each be formed with a spatial extent that is less than or equal to the diffraction limit for the light of the first wavelength and the light of the second wavelength in conjunction with an aperture of the objective used when the light of the first wavelength and the light of the second wavelength are radiated.

The light of the first wavelength can be radiated as polarized light of the first wavelength. In one embodiment, the light of the first wavelength is linearly polarized.

The light of the second wavelength can be radiated as polarized light of the second wavelength. In one embodiment, the light of the second wavelength is linearly polarized.

The light of the first wavelength and/or the light of the second wavelength can be radiated with location-dependent polarization. In the case of location-dependent polarization, the local polarization is different in different regions of a light beam cross-sectional area (transverse to the direction of light propagation) within the respective light beam for the light of the first wavelength and/or the light of the second wavelength. Location-dependent rotating polarization can be provided for the light of the first and/or second wavelength.

The polarization of the light of the first and second wavelength can be changed/adapted during the course of the processing of the starting material.

The light of the first wavelength and/or the light of the second wavelength can be radiated into the focus volume with a spatially substantially homogeneous intensity distribution. Alternatively, the light of the first wavelength and/or the light of the second wavelength can be radiated with a spatially substantially inhomogeneous intensity distribution, for example a Gaussian intensity distribution transverse to the direction of radiation.

The light of the first wavelength and/or the light of the second wavelength can be radiated as pulsed light (light pulses). Alternatively, the light of the first wavelength and/or the second wavelength can be radiated as non-pulsed light (continuous wave).

The starting material can be cured or hardened during optical processing due to the chemical reaction at least in the region of the focus volume and the further focus volumes.

The chemical reaction triggered by the active molecules in the reactive state can be carried out using a polychromatic multiphoton polymerization. By means of the optical processing, polychromatic multiphoton polymerization ("xolography") can be triggered in the starting material, which changes at least one material property of the starting material. In one exemplary embodiment, the starting material can comprise one or more of the following materials:

| Material | Structural formula | Proportion of, for example, 27.1 g starting material in total |
|---|---|---|
| Dual-color photoinitiator | 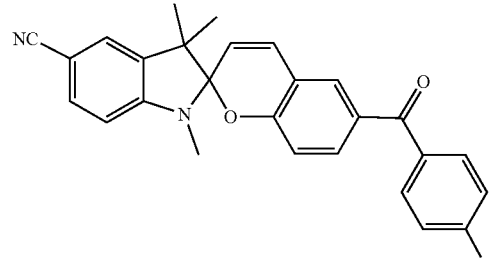 | 2 mg |
| Pentaerythritol tetraacrylate (monomer) | 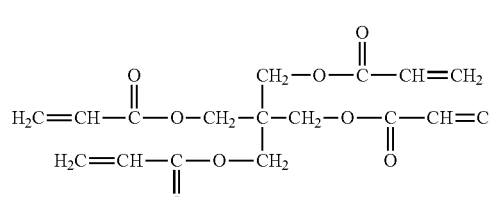 | 25.6 g (21.5 ml) |
| Triethanolamine | 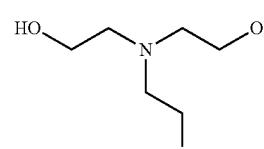 | 0.73 g (1 ml) |

| Material | Structural formula | Proportion of, for example, 27.1 g starting material in total |
| --- | --- | --- |
| Ethanol | H H<br>\| \|<br>H—C—C—OH<br>\| \|<br>H H | 0.79 g (1 ml) |

On their radiation path from the respective light source to the focus volume, the beams for the light of the first wavelength and the light of the second wavelength do not spatially overlap at least when passing through the entrance pupil and when passing through the objective. It can be provided that the beams are spatially separated in further portions of the radiation path to the focus volume, for example between the entrance pupil and the objective and/or after passing through the objective, optionally up to a substantially exclusive overlap only in the focus volume itself and, optionally, locally upstream regions outside of the local focus volume and adjacent thereto.

The embodiments described above in connection with the method can be provided accordingly in conjunction with the device for producing the three-dimensional object.

DESCRIPTION OF EMBODIMENTS

Further embodiments are explained in greater detail below with reference to the drawings, in which.

Figure 5A:
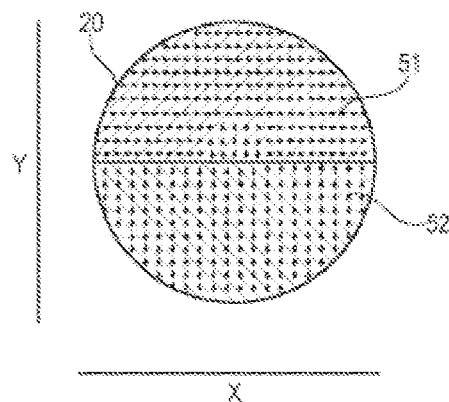
Figure 5B:
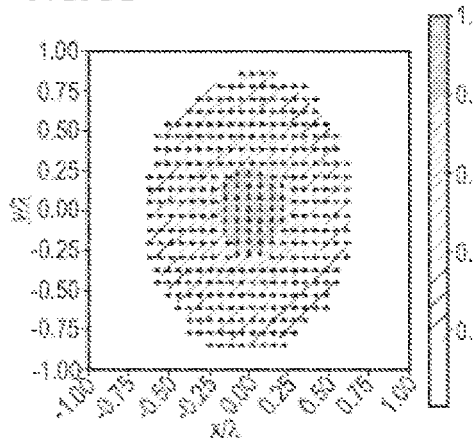
Figure 5C:
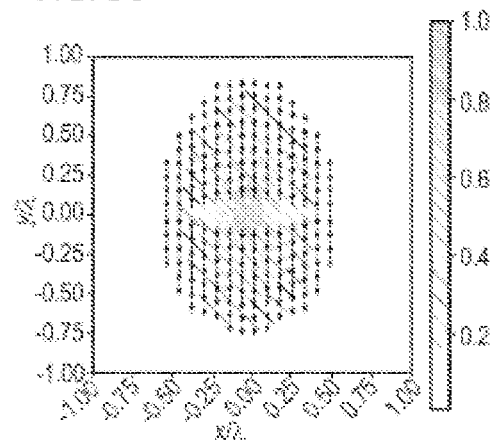
Figure 5D:
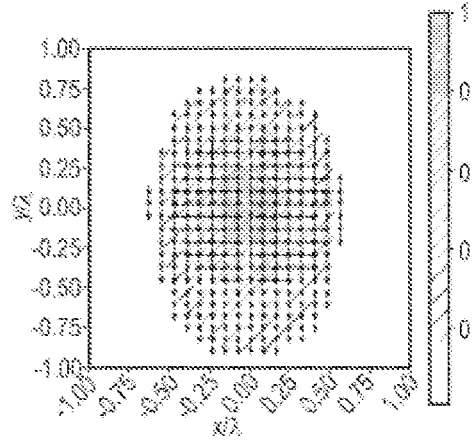

FIG. 5A depicts another embodiment in which location-dependent polarization is superimposed onto one of the two half-radiated light beams of the first wavelength, where, starting from the center, an inner semicircle is polarized in the y-direction and the remaining outer semicircle is polarized in the x-direction, and the other half-radiated light beam of the second wavelength is polarized in a simple form in the y-direction;

FIG. 5B depicts an intensity and polarization distribution in the focal plane for a first wavelength;

FIG. 5C depicts an intensity and polarization distribution in the focal plane for a second wavelength;

FIG. 5D depicts a superposition of the two focal points; and

Figure 5E:
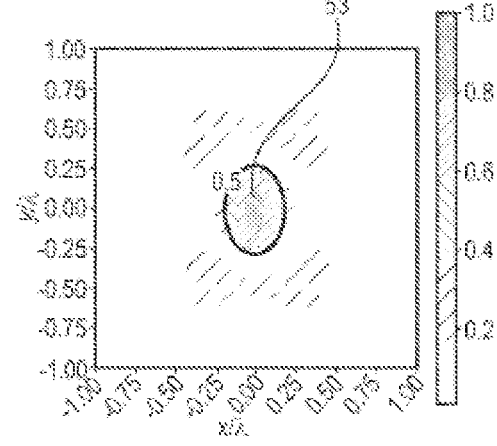

FIG. 5E depicts an excitation volume of the active photoinitiator, and how it may be reduced both in the vertical and in the horizontal direction below the diffraction limit.

Figure 1:
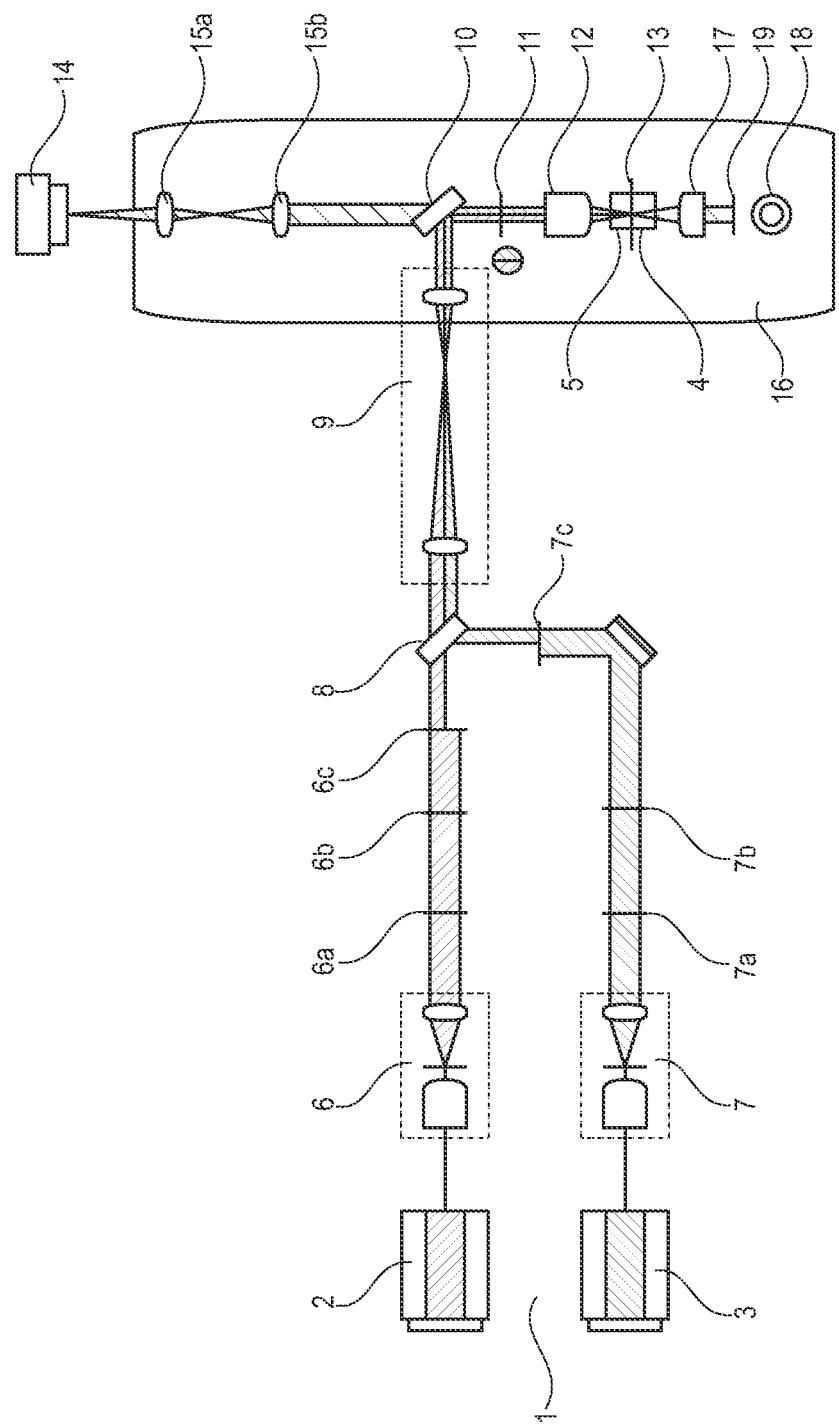
FIG. 1 is a schematic representation of a device for producing a three-dimensional object in an optically reactive starting material that contains active molecules of a dual-color photoinitiator.

FIG. 1 is a schematic representation of a device for producing a three-dimensional object or body in an optically reactive starting material. For this purpose, a lighting device 1 has a first light source 2 and a second light source 3, which are designed, for example, as laser light sources. The first and second light sources 2, 3 provide light of a first wavelength and light of a second wavelength in order to radiate them onto an optically reactive starting material 4 in a receiving volume 5.

The light of the first wavelength and the light of the second wavelength pass through a first system of optical components 6 and a second system of optical components 7. In the following, the beams of the light of the first wavelength and the light of the second wavelength are combined in a beam combiner 8 and pass through a telescope 9 therebehind in order to impinge on a beam splitter 10. From there, the light of the first wavelength and the light of the second wavelength pass through an entrance pupil 11 into an objective 12, which focuses the light of the first wavelength and the light of the second wavelength into the starting material 4 in the receiving volume 5, which is arranged on an xyz adjustment device 13.

In one embodiment, the system of first optical components 6 and the system of second optical components 7 each comprise a spatial optical filter and an element for beam expansion. A half-wave plate (HWP) 6a, 7a for rotating the polarization plane of the light beam is located downstream in the beam path of the respective system of optical components 6, 7.

Aperture diaphragms 6c, 7c are also provided in order to limit or split the light beams, for example by half (50/50 percent). Alternatively, a split of 40/60 percent or 30/70 percent can be provided.

Two lenses 15a, 15b are arranged between the camera 14 and the beam splitter 10.

In the embodiment shown, the objective 12 is arranged in a microscope 16 that has a condenser 17 and condenser lighting 18 and a filter 19 arranged therebetween. In the device in FIG. 1, a camera 14 is provided that is used to observe the processing of the starting material 4 through the microscope 16. The microscope 16 can be designed as a transmitted-light or reflected-light microscope. The observation of the processing of the starting material 4 can be carried out in bright field or dark field.

The lens 15a is a tube lens for generating an intermediate image in the infinite beam path of the microscope 16. The lens 15b provides an image of the intermediate image on a sensor of the camera 14. Optionally, further filters can be arranged between the beam splitter 10 and lens 15a to be able to observe the processing of the starting material 4 without interference from reflected or scattered light of the first and second wavelengths.

On the radiation path from the beam splitter 10 through the entrance pupil 11 and the objective 12 to the focus of the objective 12, the light of the first wavelength and the light of the second wavelength are guided in a spatially separated manner such that the two light beams do not overlap. Only in the focus of the objective 12 do the light of the first wavelength and the light of the second wavelength spatially overlap in a focus volume (spatial overlap region). As a result, active molecules of the dual-color photoinitiator in the starting material 4 are initially converted to an intermediate state by the light of the first wavelength being absorbed by said active molecules. If the light of the second wavelength is then absorbed by the active molecules in the intermediate state, the active molecules are converted into a reactive state, such that a chemical reaction, in particular a polymerization of the starting material 4, is triggered locally in the starting material 4 in the region of the respective focus volume. In this way, a material property of the starting material 4 is changed in the region of the focus volume. In particular, the starting material 4 can be cured or hardened in this way in the focus volume. During production of the three-dimensional object, the focus volume, i.e., the spatial overlap region between the light of the first wavelength and the light of the second wavelength in the focus of the objective 12, is moved in the receiving volume 5 under the control of the starting material 4 such that parts of the starting material 4 are gradually optically processed in order to produce the three-dimensional body or object.

In one example, a laser light source can be used as the light source 2, 3 for the beam (pencil of rays) of the first wavelength and second wavelength ($\lambda_1$, $\lambda_2$), for example a pulsable single-mode diode laser (make: BEAM SMART, Toptica Photonics AG) having a wavelength of 375 nm ($\lambda_1$) and 515 nm ($\lambda_2$). A maximum output power of both lasers is, for example, 100 mW in continuous wave operation. Both laser beams can each pass through a spatial filter (model: M-900, Newport) (system of optical components 6, 7) comprising an objective (model: M-20x, Newport) and a 10 µm pinhole (900PH-10, Newport) in order to generate an ideal Gaussian beam profile. A convex lens therebehind can collimate each laser beam to a diameter of about 5 to 10 mm. The half-wave plate (HWP) 6a, 7a in each beam path allows the rotation of the linearly polarized laser light. For example, Thorlabs model WPHSM05-405 can be used for $\lambda_1$ and Thorlabs model WPHSM05-514 can be used for $\lambda_2$.

Alternatively, the light sources 2, 3 can be formed with thermal light sources such as incandescent lamps or non-thermal light sources such as LEDs, discharge lamps, or lasers.

Razor blades can be used as aperture diaphragms 6c, 7c or for generating a half-illuminated aperture, which razor blades are inserted up to halfway into the beam path of each beam pencil. The beam combiner 8 can be formed with a dichroic mirror (model: DMLP425, Thorlabs) in order to combine the two beam pencils. A 4-f telescope having a magnification of 1.0 forms the aperture diaphragms in the entrance pupil 11 of the objective 12 (model: Plan-Apochromat 100×/1.4 Oil DIC M27, Zeiss AG). The objective 12 can be part of a reflected-light microscope (for example, model: RMA 5, Askania Mikroskop Technik Rathenow GmbH). An xyz positioning stage (model: P-545.3R7, Pinano, Physik Instrumente (PI) GmbH & Co. KG), for example, is used to move the focus in the starting material 4 in order to process 3-dimensional structures. The processing of the starting material is observed in the transmitted-light beam path of the microscope 16. A bandpass filter (model: FB450-40, Thorlabs) above the light source of the microscope 16 ensures that the dual-color photoinitiator in the starting material 4 is not excited by the light of the observation beam path.

For beam filtering, guidance and expansion in the systems of optical components 6 and 7, optical fibers having appropriate coupling-in and coupling-out optics can alternatively or additionally be used. Mirrors, beam splitter cubes, and/or other wavelength-sensitive beam combiners can also be used instead of a dichroic mirror to combine the beams of light of the first and second wavelengths in the beam combiner 8.

To move the focus in the starting material 4 in order to produce the three-dimensional object, a single-axis z-linear stage can be used in combination with a biaxial x-y optical scanner system instead of an xyz piezo stage, which single-axis z-linear stage is used upstream of the beam splitter 10. The scanner system can be designed as a galvanometer-based adjustable mirror.

A wavefront deformer 6b, 7b can be used to impress a location-dependent polarization over the cross-sectional area of the light beam and to change the direction of propagation of the light beam for each wavelength (cf. FIG. 1). Said wavefront deformer can be designed as a controllable spatial light modulator (SLM) based on liquid crystal devices (LCD) or liquid crystal on silicon (LCOS), or as a digital micromirror device (DMD). The implementation of specific wavefront deformers can optionally provide for the installation of additional beam guidance optics such as mirrors and lenses. An alternative option is to use segmented retardation plates, for example vortex retarders or spiral phase plates. Furthermore, combinations of two or more retardation plates of different diameters can be used to produce a linear polarization of a first orientation in an inner ring and a linear polarization of a second orientation in an outer ring in the cross-sectional area of the light beam.

To change the intensity profile of the cross-sectional area of both light beams, the apertures can also be designed as controllable spatial light modulators (SLM) based on liquid crystal devices (LCD), liquid crystal on silicon (LCOS), or digital mirror devices (DMD), alternatively also as non-controllable binary masks, diffractive optical elements (DOE), or graduated filters as well as a combination of a plurality of these elements.

The spatially separated guidance and conduction of the light beams of the first and second wavelength makes it possible to limit the expansion of the excitation volume in the starting material 4 to the overlap region of the two light beams in the focus volume. Active molecules are first converted into the activated intermediate state with light of a first wavelength. From this activated intermediate state, the active molecule can be converted into an active (reactive) form by absorbing light of the second wavelength.

Figure 2A:
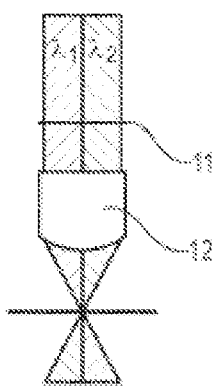
FIG. 2A is a schematic representation for a first embodiment.
Figure 2B:
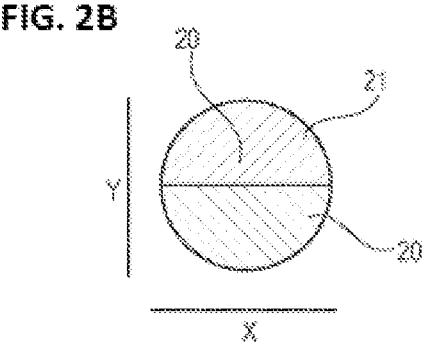
FIG. 2B depicts an entrance pupil of the embodiment of FIG. 2A.
Figure 2C:
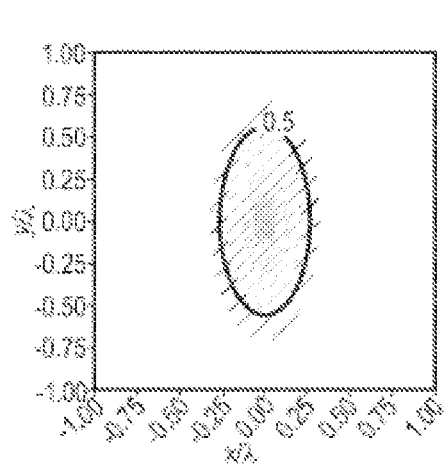
FIG. 2C depicts the focus region for the light of the first wavelength of the embodiment of FIG. 2A.
Figure 2D:
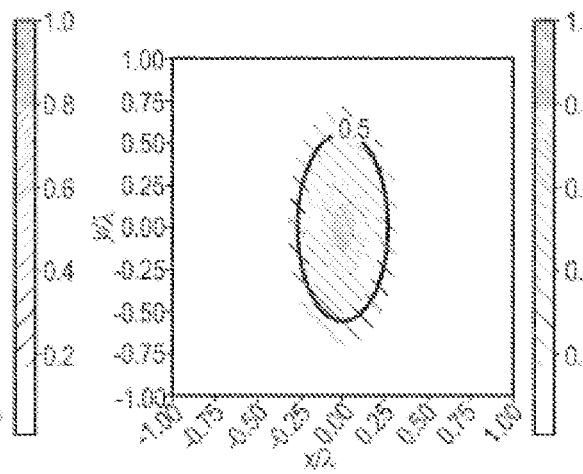
FIG. 2D depicts the focus region for the light of the second wavelength of the embodiment of FIG. 2A.
Figure 2E:
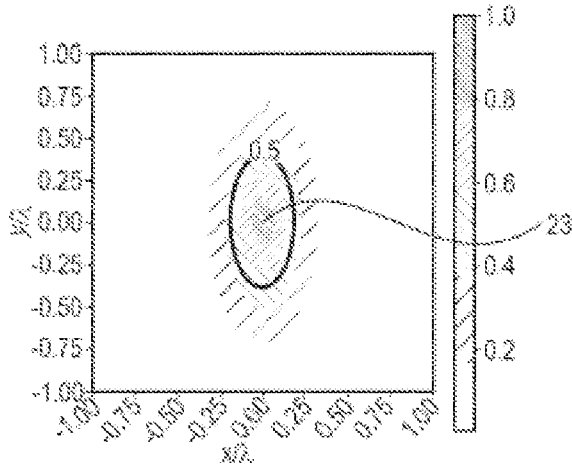
FIG. 2E depicts the reduced focus region in which the excitation of the starting material into the reactive state takes place locally.

According to a first embodiment according to FIG. 2A to 2E, the light of the first wavelength and the light of the second wavelength each illuminate an opening 20 of the entrance pupil 11 halfway in semicircular regions 21, 22 (cf. FIG. 2B). Both partial beams of different wavelengths pass through the opening 20 with a simple linear polarization in the y-direction. FIGS. 2C and 2D show the respective focus region for the light of the first wavelength (FIG. 2C) and the light of the second wavelength (FIG. 2D). FIG. 2E shows the reduced focus region 23 in which the excitation of the starting material 4 into the reactive state takes place locally.

The effectiveness of the excitation from the intermediate state by means of the light of the second wavelength can depend on the direction of polarization thereof with respect to the direction of polarization of the first wavelength. Such an effect is known per se (cf. Ramos-Garcia et al., Optical and Quantum Electronics, Vol. 35, 641-650, 2003). An effective excitation was observed, for example, when the polarization directions of the first and second wavelengths were collinear (parallel in the plane) to one another, whereas the excitation was less when the directions of the first and second wavelengths were perpendicular to one another. Considered quantitatively, the probability of absorption from the intermediate state in this example is proportional to $\cos^2(\theta)$. $\theta$ is the angle between the polarization directions of the first and second wavelengths.

In order to use the polarization effect to further improve the method for optical processing, in the sense of reducing the excitation volume below the diffraction limit, location-dependent polarization can be superimposed on the light of the first wavelength, which results in polarization structuring of one of the two focal points below the extent thereof, which is limited by the diffraction limit. The light of the other partial beam having the second wavelength is either coded independently of the location, in a simple form, for example, linearly polarized, or likewise suitably polarized as a function of the location.

An example is shown in FIG. 3A to 3E. In this case, a light beam 31 of spatially homogeneous intensity of the first wavelength is superimposed with location-dependent polarization. The light beam of the first wavelength 31 illuminates the opening 20 of the entrance pupil 11 according to FIG. 3A halfway. The polarization in this case is given by $E_x = \sin(\theta)$, $E_x = -\cos(\theta)$. The polar angle $\theta$ rotates in the plane of the entrance pupil 11. The origin of the coordinates lies in the center of the circular entrance pupil 11. A second light beam 32 having a spatially homogeneous intensity distribution of the second wavelength is polarized in a simple form in the y-direction ($E_x = 0$, $E_y = 1$) independent of the location. The intensity and polarization distribution in the focal plane of the objective 12 depends in a non-trivial way on the distribution in the entrance pupil 11 of the objective 12 and can be calculated using the Debye-Wolf integral.

The dual-color photoinitiator is converted to the intermediate state by the light focus of the first wavelength. The excitation is proportional to the local light intensity within the focus. Furthermore, predominantly only those molecules of the photoinitiator are excited which are oriented in such a way that the direction of the absorption dipole moment thereof precisely corresponds to the locally radiated polarization direction. In this way, the radiated polarization distribution of the light focus of the first wavelength is transferred to the molecule ensemble (cf. FIGS. 3B and 3C).

Figure 3A:
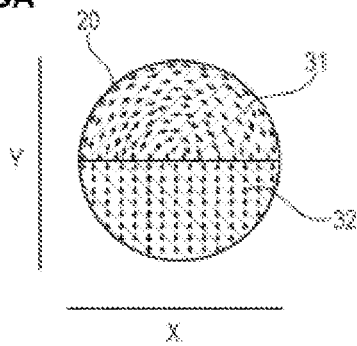
FIG. 3A is a schematic representation in conjunction with a second embodiment, wherein the light beam of the first wavelength illuminates the opening of the entrance pupil according to FIG. 3A halfway.
Figure 3B:
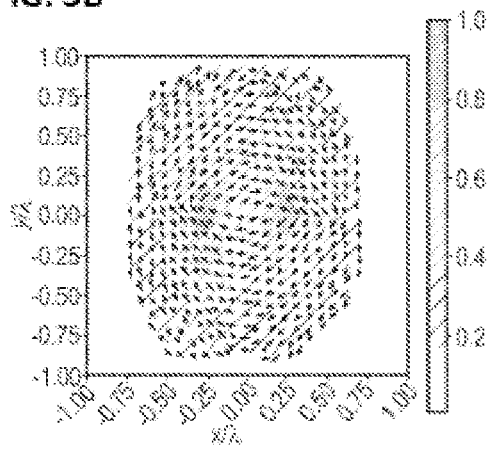
FIG. 3B is a depiction of the radiated polarization distribution of the light focus of the first wavelength transferred to the molecule ensemble.
Figure 3C:
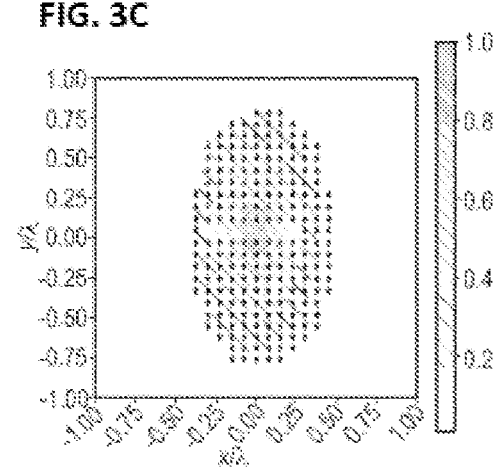
FIG. 3C is a depiction of the radiated polarization distribution of the light focus of the first wavelength transferred to the molecule ensemble.
Figure 3D:
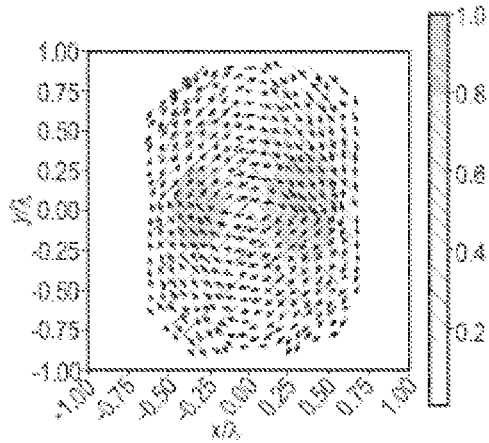
FIG. 3D is a depiction of the superimposed light focus of the second wavelength, and the excitation and conversion into the active form of only those molecules which are in the intermediate state.
Figure 3E:
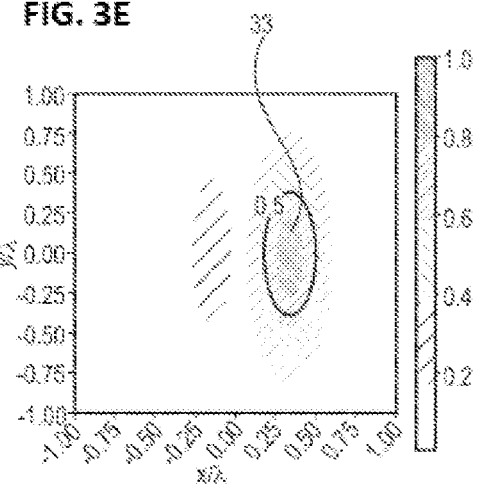
FIG. 3E depicts the reduced excitation region schematically in cross section.
Figure 4A:
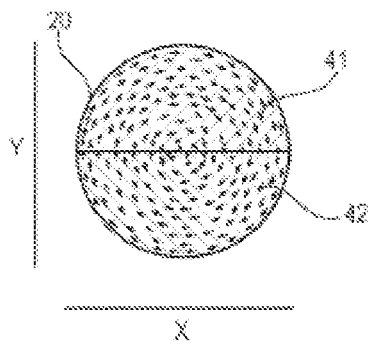
FIG. 4A depicts an example in which location-dependent, rotating polarization is superimposed onto both radiated light beams.
Figure 4B:
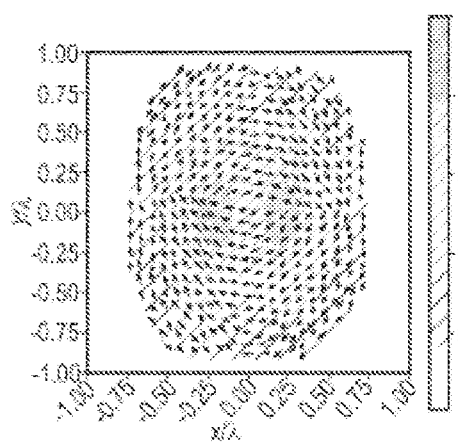
FIG. 4B depicts the intensity and polarization distribution in the focal plane for a first wavelength.
Figure 4C:
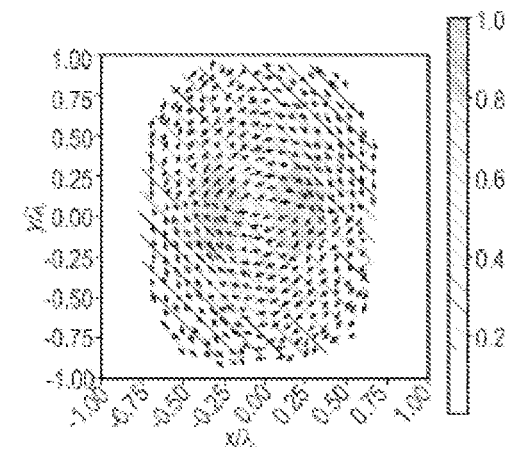
FIG. 4C depicts the intensity and polarization distribution in the focal plane for a second wavelength.
Figure 4D:
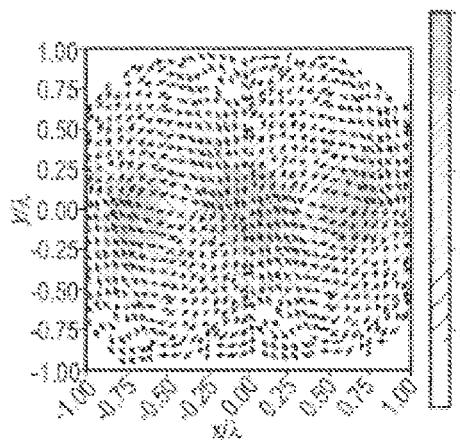
FIG. 4D depicts a horizontally shifting of the two focal points relative to one another.
Figure 4E:
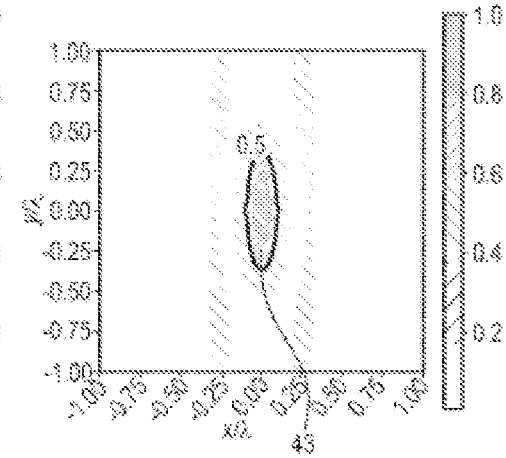
FIG. 4E depicts a reduced excitation volume of the photoinitiator.

With the superimposed light focus of the second wavelength, only those molecules which are in the intermediate state are excited and converted into the active form (FIGS. 3D and 3E). The effectiveness of this second excitation depends on the one hand on the local intensity of the second wavelength and on the other hand on the relative orientation of the polarization direction of the second wavelength compared to the first wavelength. This leads to a characteristic reduction in the excitation volume, which results from the intensity and polarization distribution of the two partial beams 31, 32. FIG. 3E shows the reduced excitation region 33 schematically in cross section. By shifting the focus of the second wavelength horizontally within the focal plane, the excitation can be limited to only one point, wherein the horizontal extent is below the diffraction limit. In the example shown, the resolution remains unchanged in the vertical direction.

Another example is shown in FIG. 4A to 4E. Here, location-dependent, rotating polarization is superimposed onto both radiated light beams 41, 42 (cf. FIG. 4A). For each light beam 41, 42 of the first and second wavelength there is an intensity and polarization distribution in the focal plane (cf. FIGS. 4B and 4C). A reduced excitation volume 43 (focus volume) of the photoinitiator is generated (cf. FIG. 4E) by horizontally shifting the two focal points relative to one another (cf. FIG. 4D). The excitation volume 43 (focus volume) can be equal to or smaller than the diffraction limit for the two wavelengths. There is also a reduction in the horizontal direction.

Through controlled three-dimensional (3D) guidance of the focus volume (reduced excitation region) in the starting material 4, in particular by means of scanning, vertical (y-direction) lines having the smaller extent of the excitation volume in the horizontal direction can be generated, for example to generate diffraction gratings.

For the generation of horizontal (x-direction) lines having a small extent, the division of the opening 20 of the entrance pupil 11 can be rotated by 90 degrees such that a vertical division by half takes place.

Another example is shown in FIG. 5A to 5E. Here, location-dependent polarization is superimposed onto one of the two half-radiated light beams 51 of the first wavelength, where, starting from the center, an inner semicircle is polarized in the y-direction and the remaining outer semicircle is polarized in the x-direction. The other half-radiated light beam 52 of the second wavelength is polarized in a simple form in the y-direction (cf. FIG. 5A).

For each light beam 51, 52 of the first and second wavelengths, there is an intensity and polarization distribution in the focal plane (cf. FIGS. 5B and 5C). The resulting superposition of the two focal points is shown in FIG. 5D. In cooperation with the dual-color photoinitiator, an excitation volume 53 of the active photoinitiator according to FIG. 5E can be reduced both in the vertical and in the horizontal direction below the diffraction limit.

By means of the optical processing described, polychromatic multiphoton polymerization ("xolography") can be triggered in the starting material 4, which changes at least one material property of the starting material 4. In one exemplary embodiment, the starting material 4 can be composed as follows:

| Material | Structural formula | Proportion of, for example, 27.1 g starting material in total |
|---|---|---|
| Dual-color photoinitiator | (structure: spiro indoline-chromene with NC and N-methyl substituents, linked to a 4-fluorobenzoyl group) | 2 mg |
| Pentaerythritol tetraacrylate (monomer) | (structure: pentaerythritol tetraacrylate) | 25.6 g (21.5 ml) |
| Triethanolamine | HO–CH₂CH₂–N(CH₂CH₂OH)–CH₂CH₂–OH | 0.73 g (1 ml) |
| Ethanol | H₃C–CH₂–OH | 0.79 g (1 ml) |

With the technology described, the starting material 4 can be structured three-dimensionally down to the nanometer range using dual-color photoinitiators by radiating light with two different wavelengths. For this purpose, the opening 20 of the entrance pupil 11 of the objective 12 focusing the radiated light is divided into two separate zones. Only the beam of one wavelength passes through each zone. The division of the typically circular opening 20 of the entrance pupil 11 of the objective 12 can be selected as desired. In one embodiment, a division into two semicircular zones can be selected. The two focused beams are only superimposed in the focal plane, such that the excitation of the dual-color photoinitiator through absorption of both light waves only takes place there.

To achieve a higher resolution, a beam can be subjected to locally variable polarization, as a result of which polarization structuring is generated in the focal plane of the objective 12 below the diffraction limit of the focal point. The beam of the second wavelength is either simply polarized linearly or also subjected to locally variable polarization. The polarization distribution of the second wavelength acts as an analyzer for the distribution of the first wavelength and, in conjunction with the dual-color photoinitiator, ensures a reduction in the excitation volume below the diffraction limit of the individual focal points of each wavelength.

The features disclosed in the above description, the claims, and the drawings may be of relevance, both individually and also in any combination, for implementing the various embodiments.

I claim:
1. A method for producing a three-dimensional object in an optically reactive starting material, comprising:
   providing the optically reactive starting material in a working volume, wherein the optically reactive starting material contains active molecules of a dual-color photoinitiator; and
   optically processing in the starting material to produce the three-dimensional object in the working volume by radiating with light of a first wavelength and light of a second wavelength that is different from the first wavelength, wherein the light of the first wavelength and the light of the second wavelength is provided by a lighting device and the optical processing comprises:
   a) radiating the light of the first wavelength through an opening of a first entrance pupil upstream of an objective and through the objective, wherein the objective focuses the light of the first wavelength in the starting material into a focus volume in a focus of the objective such that active molecules that absorb the light of the first wavelength transition into an intermediate state;
   b) radiating the light of the second wavelength through the opening of the entrance pupil and through the objective, wherein the objective focuses the light of the second wavelength in the starting material into the focus volume such that active molecules within the focus volume that are in the intermediate state and absorb the light of the second wavelength transition into a reactive state and a chemical reaction is thereby triggered in the focus volume so that a material property of the starting material is locally changed; and then c) producing the three-dimensional object by repeating steps a) and b) for further focus volumes that are different from the focus volume;

wherein, during radiation, the light of the first wavelength and the light of the second wavelength are radiated, on a path to the focus volume, in a spatially non-overlapping manner at least when passing through the first entrance pupil and when conditioned by the first entrance pupil passing through the objective and in a spatially overlapping manner in the focus volume.

2. The method according to claim 1, characterized in that the light of the first wavelength and the light of the second wavelength are radiated such that they each fill approximately half of an opening area of the opening of the first entrance pupil.

3. The method according to claim 1, characterized in that the light of the first wavelength and the light of the second wavelength are radiated such that they each fill approximately half of a cross-sectional area of a light passage of the objective.

4. The method according to claim 1, characterized in that the focus volume and the further focus volumes are each formed with a spatial extent that is less than or equal to the diffraction limit for the light of the first wavelength and the light of the second wavelength in conjunction with an aperture of the objective used when the light of the first wavelength and the light of the second wavelength are radiated.

5. The method according to claim 1, characterized in that the light of the first wavelength is radiated as polarized light of the first wavelength.

6. The method according to claim 1, characterized in that the light of the second wavelength is radiated as polarized light of the second wavelength.

7. The method according to claim 5, characterized in that the light of the first wavelength and/or the light of the second wavelength is radiated with a location-dependent polarization.

8. The method according to claim 1, characterized in that the light of the first wavelength and/or the light of the second wavelength is radiated into the focus volume with a spatially substantially homogeneous intensity distribution.

9. The method according to claim 1, characterized in that the light of the first wavelength and/or the light of the second wavelength is radiated as pulsed light.

10. The method according to claim 1, characterized in that the starting material is cured or hardened during optical processing due to the chemical reaction at least in the region of the focus volume and the further focus volumes.

11. The method according to claim 1, characterized in that the chemical reaction triggered by the active molecules in the reactive state is carried out using a polychromatic multiphoton polymerization.

12. A method, comprising:

optically processing a starting material in a working volume to produce a three-dimensional object in the working volume by radiating with light of a first wavelength and light of a second wavelength that is different from the first wavelength, the starting material being optically reactive and containing active molecules of a dual-color photoinitiator, wherein the light of the first wavelength and the light of the second wavelength is provided by a lighting device and the optical processing comprises:

a) radiating the light of the first wavelength through an opening of a first entrance pupil upstream of an objective and through the objective, wherein the objective focuses the light of the first wavelength in the starting material into a focus volume in a focus of the objective such that active molecules that absorb the light of the first wavelength transition into an intermediate state;

b) radiating the light of the second wavelength through the opening of the entrance pupil and through the objective, wherein the objective focuses the light of the second wavelength in the starting material into the focus volume such that active molecules within the focus volume that are in the intermediate state and absorb the light of the second wavelength transition into a reactive state and a chemical reaction is thereby triggered in the focus volume so that a material property of the starting material is locally changed; and then c) producing the three-dimensional object by repeating steps a) and b) for one or more further focus volumes different from the focus volume;

wherein, during radiation, the light of the first wavelength and the light of the second wavelength are radiated, on a path to the focus volume, in a spatially non-overlapping manner at least when passing through the first entrance pupil and when conditioned by the first entrance pupil passing through the objective and in a spatially overlapping manner in the focus volume.

13. The method according to claim 12, characterized in that the light of the first wavelength and the light of the second wavelength are radiated such that they each fill approximately half of an opening area of the opening of the first entrance pupil.

14. The method according to claim 12, characterized in that the light of the first wavelength and the light of the second wavelength are radiated such that they each fill approximately half of a cross-sectional area of a light passage of the objective.

15. The method according to claim 12, characterized in that the focus volume and the further focus volumes are each formed with a spatial extent that is less than or equal to the diffraction limit for the light of the first wavelength and the light of the second wavelength in conjunction with an aperture of the objective used when the light of the first wavelength and the light of the second wavelength are radiated.

16. The method according to claim 12, The method according to claim 1, characterized in that the light of the first wavelength is radiated as polarized light of the first wavelength.

17. The method according to claim 12, characterized in that the light of the second wavelength is radiated as polarized light of the second wavelength, and characterized in that the light of the first wavelength and/or the light of the second wavelength is radiated with a location-dependent polarization.

18. The method according to claim 12, characterized in that the light of the first wavelength and/or the light of the second wavelength is radiated into the focus volume with a spatially substantially homogeneous intensity distribution.

19. The method according to claim 12, characterized in that the light of the first wavelength and/or the light of the second wavelength is radiated as pulsed light.

20. The method according to claim 12, characterized in that the starting material is cured or hardened during optical processing due to the chemical reaction at least in the region of the focus volume and the further focus volumes; or characterized in that the chemical reaction triggered by the active molecules in the reactive state is carried out using a polychromatic multiphoton polymerization.

* * * * *